United States Patent
Rakshit et al.

(10) Patent No.: US 12,459,365 B2
(45) Date of Patent: Nov. 4, 2025

(54) CALCULATING CARBON FOOTPRINT WHILE TRAVERSING ROUTE BASED ON PREDICTED INCREMENTAL BATTERY DEGRADATION

(71) Applicant: International Business Machines Corporation, Armonk, NY (US)

(72) Inventors: Sarbajit K. Rakshit, Kolkata (IN); Reji Jose, Bangalore (IN); Sathya Santhar, Ramapuram (IN); Sridevi Kannan, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 18/497,849

(22) Filed: Oct. 30, 2023

(65) Prior Publication Data

US 2025/0135893 A1    May 1, 2025

(51) Int. Cl.
*B60L 3/00*    (2019.01)
*B60L 58/10*    (2019.01)

(52) U.S. Cl.
CPC .......... *B60L 3/0046* (2013.01); *B60L 58/10* (2019.02)

(58) Field of Classification Search
CPC .............................. B60L 3/0046; B60L 58/10
See application file for complete search history.

(56) References Cited

U.S. PATENT DOCUMENTS

| | | |
|---|---|---|
| 10,527,678 B2 | 1/2020 | Lee |
| 11,035,903 B2 | 6/2021 | Narayanaswami |
| 2007/0105672 A1 * | 5/2007 | Luedtke ................ F16H 63/067 474/33 |
| 2009/0177580 A1 | 7/2009 | Lowenthal et al. |
| 2010/0145833 A1 * | 6/2010 | Hamilton, II ........ G06Q 20/227 705/400 |
| 2011/0082621 A1 | 4/2011 | Berkobin et al. |
| 2017/0351978 A1 | 12/2017 | Bellowe |

(Continued)

FOREIGN PATENT DOCUMENTS

| | | |
|---|---|---|
| CN | 102043132 B | 6/2014 |
| CN | 105467324 A | 4/2016 |

OTHER PUBLICATIONS

"Rechargeable Zinc battery (dendrites problem)," Cayrex, 3 pages, YouTube, accessed Oct. 16, 2023, https://www.youtube.com/watch?v=SY0j8Wr4NK0&t=1s.

(Continued)

*Primary Examiner* — Joan T Goodbody
*Assistant Examiner* — Godfrey Aleksander Maciorowski
(74) *Attorney, Agent, or Firm* — Yee & Associates, P.C.

(57) ABSTRACT

A computer implemented method, system and product to predict an incremental degradation of a battery of a transportation vehicle while traveling on a route using a number of battery degradation parameters and a current condition of the battery as inputs in an artificial intelligence enabled system trained using historical battery degradation parameters. An equivalent carbon footprint is calculated based on the incremental degradation of the battery of the transportation vehicle. An equivalent carbon footprint tax is calculated based on the equivalent carbon footprint. The equivalent carbon footprint tax is assessed against the transportation vehicle.

20 Claims, 7 Drawing Sheets

(56) References Cited

U.S. PATENT DOCUMENTS

2024/0067031 A1* 2/2024 Meroux ................. G06N 20/00
2024/0391352 A1* 11/2024 Abbaraju ........... G01R 31/3648

OTHER PUBLICATIONS

AEL, "How does battery disposal impact the environment?" Copyright 2023, 4 pages, American Environmental Landfill, Inc., Sand Srings, OK, accessed Oct. 17, 2023, https://aelok.com/2020/03/12/how-does-battery-disposal-impact-the-environment/.

Diamond, "Cracking up: new insights into dendrite formation could make solid-state lithium batteries commercially viable," Research: Science Highlights, 2021, 3 pages, Diamond Light Source Ltd., Oxfordshire, UK, accessed Oct. 13, 2023, https://www.diamond.ac.uk/Science/Research/Highlights/2021/new-insights-make-solid-state-li-batteries-commercially-viable.html.

Gowda, et al., "Assessment and Tracking Electric Vehicle Battery Degradation Cost using Blockchain," 2021 IEEE Power & Energy Society Innovative Smart Grid Technologies Conference (ISGT), 6 pages, IEEE, accessed Oct. 13, 2023, http://dx.doi.org/10.1109/ISGT49243.2021.9372218.

Jafari, et al., "Prediction of the Battery State Using the Digital Twin Framework Based on the Battery Management System," Research Article, Nov. 28, 2022, pp. 124685-124696, vol. 10, IEEE Access, accessed Oct. 13, 2023, https://ieeexplore.ieee.org/document/9964197.

Kong, et al., "Battery Power Online: A Look Inside Your Battery: Watching the Dendrites Grow," 23rd Annual Advanced Automotive Battery Conference, Aug. 24, 2020, 3 pages, Cambridge EnerTech, Needham, MA, accessed Oct. 13, 2023, https://www.batterypoweronline.com/news/a-look-inside-your-battery-watching-the-dendrites-grow/.

Kumar, "How recycling battery waste is important for environmental health?" Financial Express, Jul. 21, 2022, 3 pages, FinancialExpress.com, accessed Oct. 17, 2023, https://www.financialexpress.com/life/science-how-recycling-battery-waste-is-important-for-environmental-health-2601507/.

MPowerUK, "Battery and Energy Technologies: Battery Life (and Death)," Electropaedia, Copyright 2005, 11 pages, Woodbank Communications Ltd., Chester, UK, accessed Oct. 13, 2023, https://www.mpoweruk.com/life.htm.

MSESupplies, "Source of Detrimental Dendrite Growth in Lithium Batteries Discovered," MSE Supplies, Oct. 17, 2019, 1 page, MSE Supplies LLC, accessed Oct. 13, 2023, https://www.msesupplies.com/blogs/news/source-of-detrimental-dendrite-growth-in-lithium-batteries-discovered.0.

Battery Life (and Death), Retrieved from: https://web.archive.org/web/20230712061909/https://www.mpoweruk.com/life.htm, Jul. 12, 2023, 11 pages.

Battery Recycling is Important for Environmental Health 4 Things You Should Know About Battery Disposal and The Environment, https://web.archive.org/web/20200805193743/https://gsiwaste.com/battery-recycling-is-important-for-environmental-health/, Aug. 5, 2020, 4 pages.

Battery Storage, Retrieved from: https://web.archive.org/web/20231201220138/https://mpoweruk.com/storage.htm, Dec. 1, 2023, 6 pages.

History of Technology, Retrieved from: https://web.archive.org/web/20240416000514/https://mpoweruk.com/history.htm, Apr. 16, 2024, 1 pages.

* cited by examiner

CALCULATING CARBON FOOTPRINT WHILE TRAVERSING ROUTE BASED ON PREDICTED INCREMENTAL BATTERY DEGRADATION

BACKGROUND

The disclosure relates generally to calculating an equivalent carbon footprint and more specifically to calculating the equivalent carbon footprint tax while traversing a route based on predicted incremental degradation of a transportation vehicle battery health.

Batteries can have a significant environmental impact both during manufacturing and after disposal. Disposal typically occurs when a battery reaches the end of its life or experiences an unacceptable decline in performance. Over time, batteries may experience reduced capacity and performance. Several factors contribute to the degradation of battery performance, including operational and environmental parameters, formation of dendrites, the number and depth of recharging cycles, and mechanical shocks that can cause damage such as cracks.

Therefore, it would be desirable to have a method and apparatus that take into account at least some of the battery degradation issues discussed above, as well as other possible issues. For example, it would be desirable to have a method and apparatus that can track incremental degradation, battery usage pattern, battery specification and impose appropriate tax based on equivalent carbon footprints.

SUMMARY

According to an illustrative embodiment, a computer implemented method predicts, by a number of processor units, an incremental degradation of a battery of a transportation vehicle while traveling on a route using a number of battery degradation parameters and a current condition of the battery as inputs in an artificial intelligence enabled system trained using historical battery degradation parameters. The number of processor units calculates an equivalent carbon footprint based on the incremental degradation of the battery of the transportation vehicle. The processor units calculate an equivalent carbon footprint tax based on the equivalent carbon footprint. The processor units assess the equivalent carbon footprint tax against the transportation vehicle. According to other illustrative embodiments, a computer system and a computer program product for predicting incremental degradation of a battery of a transportation vehicle while traveling on a route using a number of battery degradation parameters and a current condition of the battery as inputs in an artificial intelligence enabled system trained using historical battery degradation parameters are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
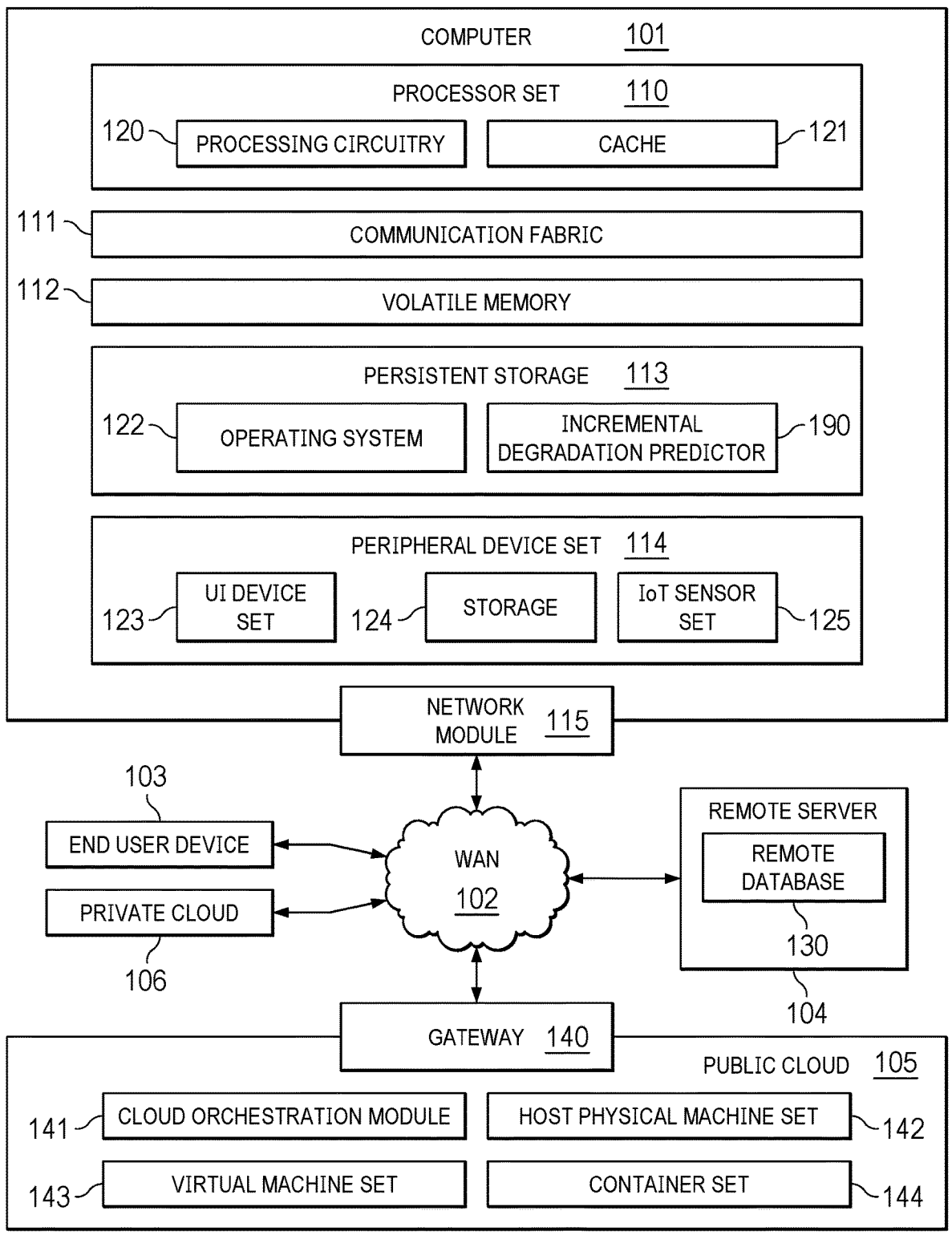
FIG. 1 is a block diagram of a computing environment in accordance with an illustrative embodiment.

With reference now to the figures in particular with reference to FIG. 1, a block diagram of a computing environment is depicted in accordance with an illustrative embodiment. Computing environment 100 contains an example of an environment for the execution of at least some of the computer code involved in performing the inventive methods, such as predicting, using an artificial intelligence enabled system, an incremental degradation of a battery of a transportation vehicle, calculating an equivalent carbon footprint, calculating an equivalent carbon footprint tax, and assessing the tax against the vehicle. Embodiments of this disclosure can be embodied in block 190. In addition to block 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Block 190 is a generic representation of a predictor/assessor/levier/controller for predicting incremental degradation of a battery in a transportation vehicle. The transportation vehicle can be an electric vehicle (EV). The battery can be to power electric machine(s) and/or an auxiliary battery in an EV or to power a starter/auxiliary battery in a non-EV vehicle.

Batteries can have a significant environmental impact both during manufacturing and after disposal. Disposal typically occurs when a battery reaches the end of its life or experiences a decline in performance. Over time, batteries may experience reduced capacity and performance. Several factors contribute to the degradation of battery performance, including operational and environmental parameters, formation of dendrite, the number of recharging cycles, and mechanical shocks that can cause damage or cracks. So, we need a method and system which can track the battery usage pattern, battery specification and impose appropriate tax based on equivalent carbon footprint.

In general, several parameters can have an impact on the health of an electric vehicle (EV) battery, which can ultimately affect its performance and lifespan. Parameters can include thermal, electrical and/or dynamic. The following are some key parameters.

Temperature plays a crucial role in battery health. Extreme temperatures, both high and low, can accelerate battery degradation and reduce its overall lifespan. High temperatures can lead to increased chemical reactions, electrolyte breakdown, and accelerated aging, while low temperatures can affect the battery's ability to deliver power efficiently.

The state of charge (SOC) refers to the current level of battery charge compared to its maximum capacity. Operating an EV battery at extremely high or low SOC levels for extended periods can contribute to degradation. It is generally recommended to avoid prolonged periods of very high or very low SOC to maintain optimal battery health.

The charging speed and current used to recharge an EV battery can impact its health. Charging at higher currents or using rapid charging stations may generate more heat and increase stress on the battery, potentially leading to accelerated degradation. It is important to follow manufacturer recommendations for charging rates and use compatible charging equipment.

The depth of discharge (DOD) refers to the amount of energy drawn from the battery before recharging. Operating an EV battery at consistently high DOD levels (discharging it deeply) can contribute to accelerated aging and reduced battery life. Limiting the depth of discharge and avoiding frequent full discharges can help maintain battery health.

The number of charge-discharge cycles a battery undergoes affects its health. The number of cycles per unit time can be termed cycling frequency. Higher cycling frequency can contribute to gradual capacity loss and reduced overall battery lifespan. Minimizing unnecessary charge-discharge cycles, such as avoiding excessive partial charging or frequent rapid charging, can help preserve battery health.

Proper maintenance and care can significantly impact battery health. This includes regular inspections, monitoring for signs of abnormal behavior, and following manufacturer recommendations for maintenance procedures. Keeping the battery within its recommended temperature range and avoiding exposure to extreme conditions can also help prolong its health.

Based on historical learning about battery degradation parameters (e.g. temperature raises in the battery, cooling capability of the vehicle, number of recharging cycles, etcetera), embodiments of this disclosure can predict how much degradation will happen in the transportation vehicle battery while travelling in any selected route considering the current health condition of the battery, and accordingly based on predefined equivalent carbon footprint appropriate tax will be recovered from the said transportation vehicle.

Embodiments of this disclosure can capture the number of previous recharging cycles, vehicle operation parameters (such as jerking (e.g. random braking), rate of power discharge, etcetera), maintained environmental parameters on the battery (such as temperature, etcetera), battery specification (such as materials used in the battery, etcetera) the proposed system will be estimating current health condition of the battery, and considering the current health condition of the battery as a baseline, invention will be calculating the equivalent carbon footprint during the travel and accordingly tax will be calculated.

Embodiments of this disclosure can include using blockchain track how the transportation vehicle is managing the battery operational and environmental parameter to maintain the battery life of the battery, and accordingly the same will be considered by the machine learning model (AI) system to calculate how much equivalent carbon footprint tax are to be imposed on the transportation vehicle.

Embodiments of this disclosure can consider what sources of power are being used for recharging the transportation vehicle batteries (like non-renewable vs renewable energy) and accordingly the proposed system will be considering the same in calculating the equivalent carbon footprint tax, thus the invention will be considering the sources of power and dynamic usage pattern of battery to calculate carbon equivalent tax are to be imposed on the transportation vehicle.

Embodiments of this disclosure can use blockchain to track what types of maintenance are performed in the transportation vehicles, and based on historical learning invention will predict how the battery health got improved, and accordingly baseline of the battery health will be redefined to calculate the carbon footprint tax.

In addition to determining the equivalent carbon footprint and the equivalent carbon footprint tax, embodiments of this disclosure can include controlling and performing actions that reduce the equivalent carbon footprint. For instance, embodiments of this disclosure can perform a number of actions for the reduction of battery degradation. These reduction of battery degradation actions can include reducing or limiting acceleration and/or reducing or limiting speed. This can reduce high current draws that reduce temperature issues on the battery. The reduction of battery degradation actions can include engaging regenerative braking. The reduction of battery degradation actions can include recharging the battery to avoid charge level from falling below a level that increases battery degradation. The reduction of battery degradation actions can include reducing use of an auxiliary system such as AC, heating, and other electronic systems in the EV. The reduction of battery degradation actions can include changing the route. For instance, a new route can avoid steep inclines. As another example, the new route can avoid traffic.

Figure 2:
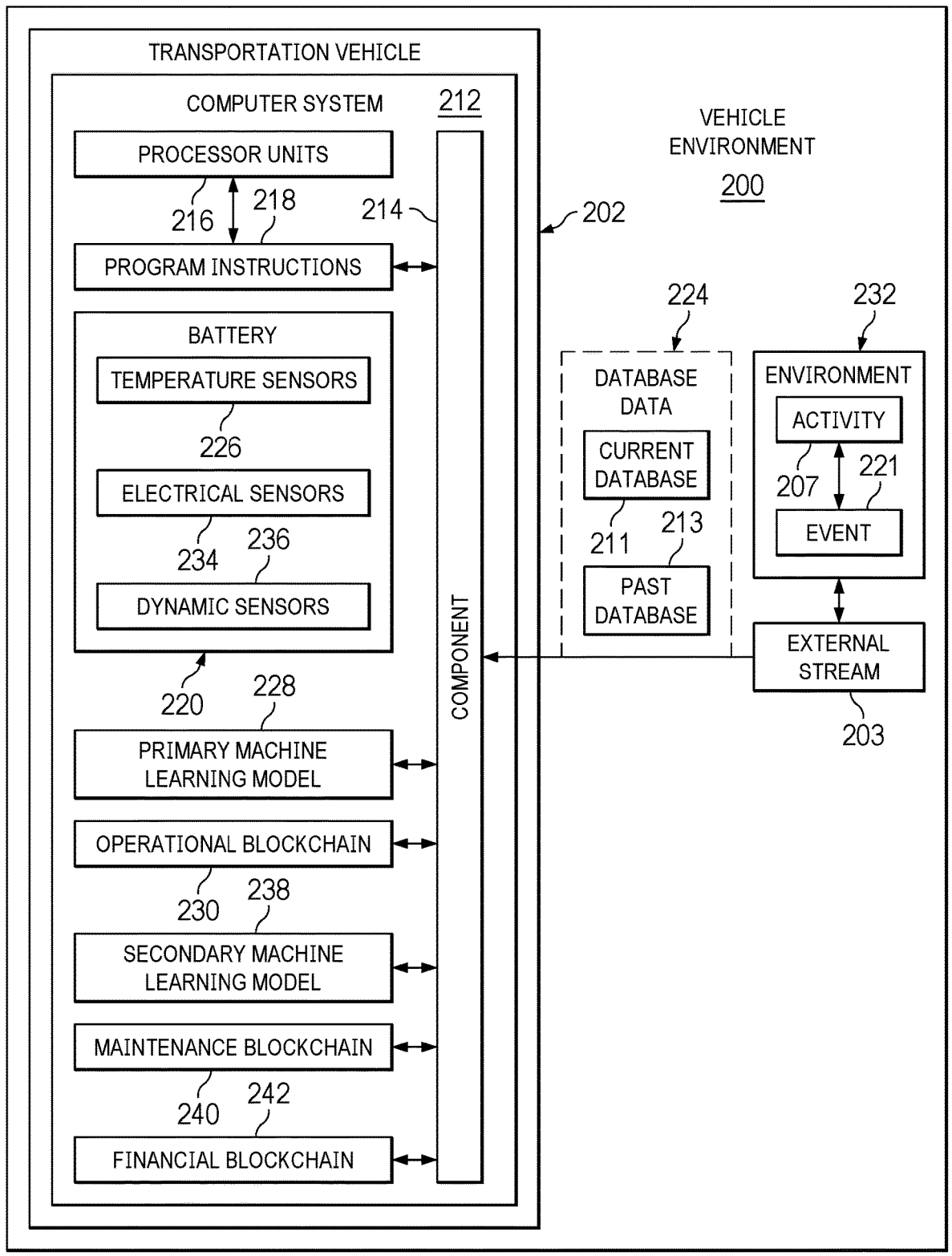
FIG. 2 is a block diagram of a transportation vehicle in accordance with an illustrative embodiment.

With reference now to FIG. 2, a block diagram of a vehicle environment is depicted in accordance with an illustrative embodiment. In this illustrative example, vehicle environment 200 includes components that can be implemented in hardware such as the hardware shown in computing environment 100 in FIG. 1.

Transportation vehicle 202 is located in vehicle environment 200. Transportation vehicle 202 includes computer system 212. External stream 203 is coupled to computer system 212 and can provide external data. External stream 203 can convey environment data 232. Environmental data 232 can include activity data 207 and event data 221. External stream 203 can convey database data 224. Database data 224 can include current database data and/or past database data. Computer system 212 includes component 214.

Component 214 may be termed a predictor, assessor, levier and/or controller because component 214 implements a number of these functions such as one, some or all of these functions. In particular, component 214 may be deployed and/or implemented using block 190 in FIG. 1.

Component 214 can be implemented in software, hardware, firmware or a combination thereof. When software is used, the operations performed by component 214 can be implemented in program instructions configured to run on hardware, such as a processor unit. When firmware is used, the operations performed by component 214 can be implemented in program instructions and data and stored in persistent memory to run on a processor unit. When hardware is employed, the hardware can include circuits that operate to perform the operations in component 214.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of parameters" is one or more parameters. As another example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

The phrase "equivalent carbon footprint" means an estimated or calculated mass of carbon adjusted by one or more government (or non-government organization (NGO)) authorized mathematical functions such as, for example, moles of carbon multiplied by an authorized variable or constant (e.g., 1 or unity) applicable or assigned to a particular transportation vehicle. Of course, embodiments are not limited to this simple exemplary function and constant, and the estimated or calculated mass can be of any material containing carbon, and can be adjusted by a number of functions, a number of variables and/or a number of constants. Further, the phrases "equivalent carbon footprint" and "carbon footprint equivalent" mean the same thing. Furthermore, the phrase "equivalent carbon footprint tax" means the equivalent carbon footprint adjusted by one or more government (or NGO) authorized tax rate(s) such as, for example, equivalent carbon footprint units multiplied by a variable or constant that is applicable or assigned to the particular transportation vehicle.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 216 that are capable of executing program instructions 218 implementing processes in the illustrative examples. In other words, program instructions 218 are computer readable program instructions.

As used herein, a processor unit in the number of processor units 216 is a hardware device and is comprised of hardware circuits such as those on an integrated circuit that respond to and process instructions and program code that operate a computer. A processor unit can be implemented using processor set 110 in FIG. 1. When the number of processor units 216 executes program instructions 218 for a process, the number of processor units 216 can be one or more processor units that are in the same computer or in different computers. In other words, the process can be distributed between processor units 216 on the same or different computers in computer system 212.

Further, the number of processor units 216 can be of the same type or different types of processor units. For example, the number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

Computer system 212 can be configured to perform at least one of the steps, operations, or actions described in the different illustrative examples using software, hardware, firmware or a combination thereof. As a result, computer system 212 operates as a special purpose computer system in which component 214 in computer system 212 enables predicting an incremental degradation of a battery of a transportation vehicle, calculating, assessing and levying an equivalent carbon footprint tax from the vehicle, and controlling the vehicle. In particular, component 214 transforms computer system 212 into a special purpose computer system as compared to currently available general computer systems that do not have component 214.

In this example, the equivalent carbon footprint tax can be in the form of a debit against a financial account or a carbon footprint account. A carbon footprint account or assessment identifies the greenhouse gases directly or indirectly amended as a result of activities, operations, or processes for an entity such as an individual or an organization. The debit identifies increases in the amount of greenhouse gases. This equivalent carbon footprint tax can also be in the form of a credit. A credit can be deducted from a carbon footprint assessment as a reward to encourage lower battery degradation during use. This identification of the lower battery degradation can be determined by comparing the incremental battery degradation to a standard or expected incremental battery degradation.

In the illustrative example, the use of component 214 in computer system 212 integrates processes into a practical application for predicting, using an artificial intelligence enabled system, an incremental degradation of a battery of a transportation vehicle based on a selected route, historical learning about battery degradation parameters, and a current condition of the battery of the transportation vehicle that increases the performance of computer system 212. In other words, component 214 in computer system 212 is directed to a practical application of processes integrated into component 214 in computer system 212 that controls the transportation vehicle based on assessment of a carbon footprint tax based on predicted incremental battery degradation during traverse of a selected route. In this illustrative example, component 214 in computer system 212 can also control the transportation vehicle including altering the future portion of the route and/or switching the transportation vehicle to at least one of limp mode or brick mode, for example, but not limited to when an assessed tax cannot be levied. In this manner, component 214 in computer system 212 provides a practical application of predicting, using an artificial intelligence enabled system, an incremental degradation of a battery of a transportation vehicle based on a selected route, historical learning about battery degradation parameters, and a current condition of the battery of the transportation vehicle such that the functioning of computer system 212 and transportation vehicle 202 are improved.

Transportation vehicle 202 includes battery 220. Battery 220 can be a rechargeable battery or a non-rechargeable battery. Battery 220 can be the prime power source for an electric vehicle. Battery 220 can be the auxiliary battery for an electric vehicle. Battery 220 can be the starting battery for a non-electric vehicle. Battery 220 can be an auxiliary battery for a non-electric vehicle.

Battery 220 can include temperature sensors 226. Battery 220 can include electrical sensors 234. Battery 220 can include dynamic sensors 236. Data from these sensors can be recorded and/or used for at least one predicting incremental degradation of battery 220, calculating, tracking, assessing, levying, reducing incremental degradation of battery 220, controlling (e.g., inhibiting) operations of vehicle 202, or other purposes.

Computer system 212 includes primary machine learning model 228. Model 228 can utilize a convolutional neural network. Computer system 212 can include operational blockchain 230. Operational blockchain 230 can be used to track and/or authenticate operational parameters of transportation vehicle 202 such as speed, acceleration, temperature, etcetera. Computer system 212 can include secondary machine learning model 238. Model 238 can utilize a convolutional neural network. Computer system 212 can include maintenance blockchain 240. Maintenance blockchain 240 can be used to track and/or authenticate maintenance parameters of transportation vehicle 202 such as number of recharging cycles, rapidity of recharging cycles, dendrite mitigation, etcetera. Computer system 212 can include financial blockchain 242. Financial blockchain 242 can be used to track and/or authenticate assessing equivalent carbon footprint tax on the transportation vehicle 202. Financial blockchain 242 can be used to track and/or authenticate levying of the equivalent tax from transportation vehicle 202.

The illustration of the transportation vehicle and its environment in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
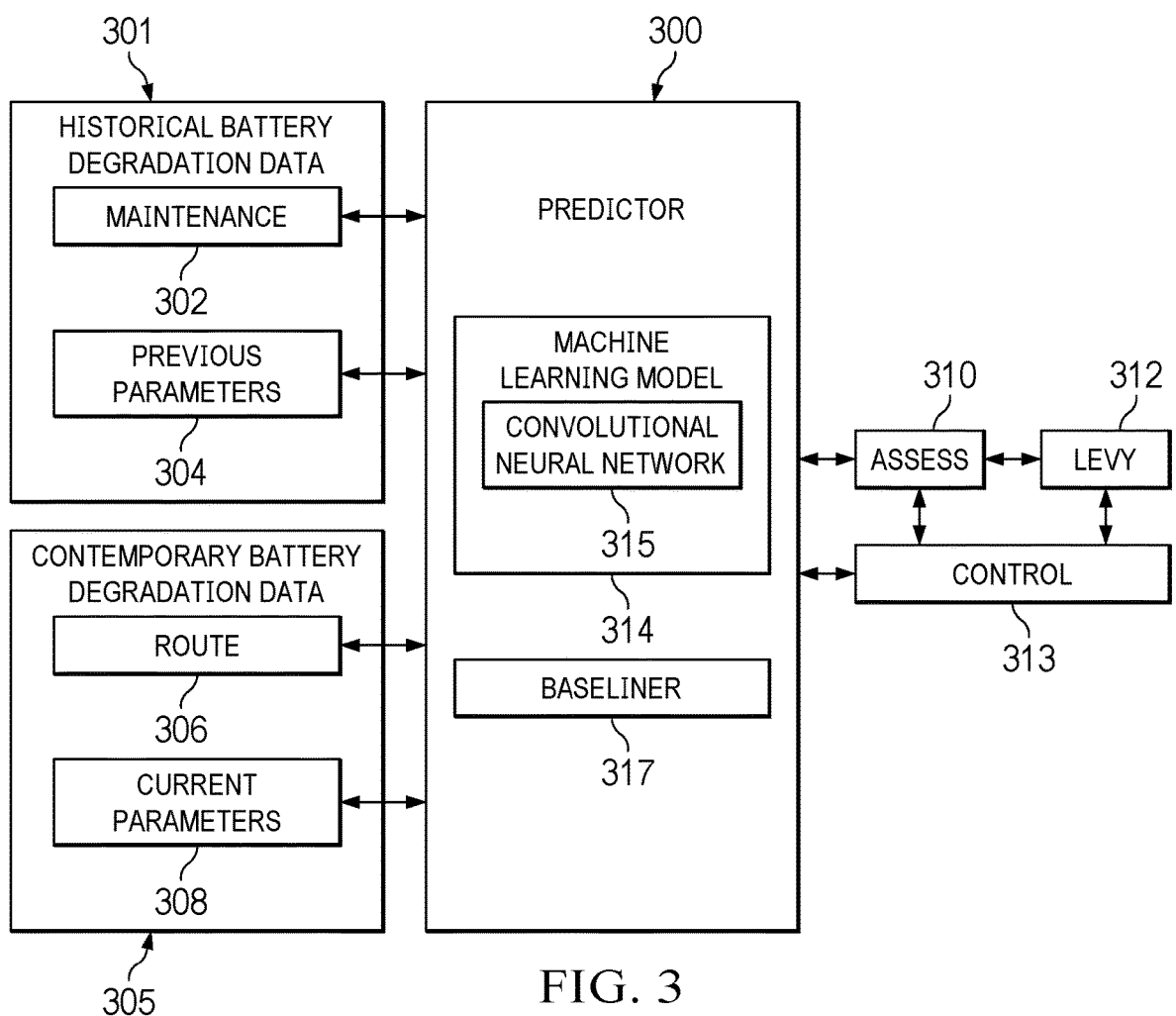
FIG. 3 is a dataflow for predicting an incremental degradation of a battery of a transportation vehicle, calculating, assessing and levying an equivalent carbon footprint tax from the vehicle, and controlling the vehicle in accordance with an illustrative embodiment.

Turning next to FIG. 3, a dataflow diagram of embodiments of this disclosure is depicted. Predictor 300 includes machine learning module 314 which in turn includes convolutional neural network 315. Predictor 300 also includes baseliner 317 that can provide data regarding the current state of a battery. Block 301 includes block 302 and block 304. The data in block 301 can be termed historical battery degradation data and can be used to train a machine learning model as well as provide data regarding at least one particular battery. Block 302 provides maintenance data bidirectionally with regard to predictor 300. Block 304 provides previous parameters data bidirectionally with regard to predictor 300. Block 305 includes block 306 and block 308. The data in block 305 can be termed contemporary battery degradation data and can be used to provide contemporaneous data regarding at least one particular battery. Block 306 provides route data bidirectionally with regard to predictor 300. Block 308 provides current parameters data bidirectionally with regard to predictor 300. Block 310 provides assessment data bidirectionally with regard to predictor 300. Block 312 provides levy data by directionally with regard to block 310. Block 313 provides control data bidirectionally with regard to predictor 300.

Figure 4:
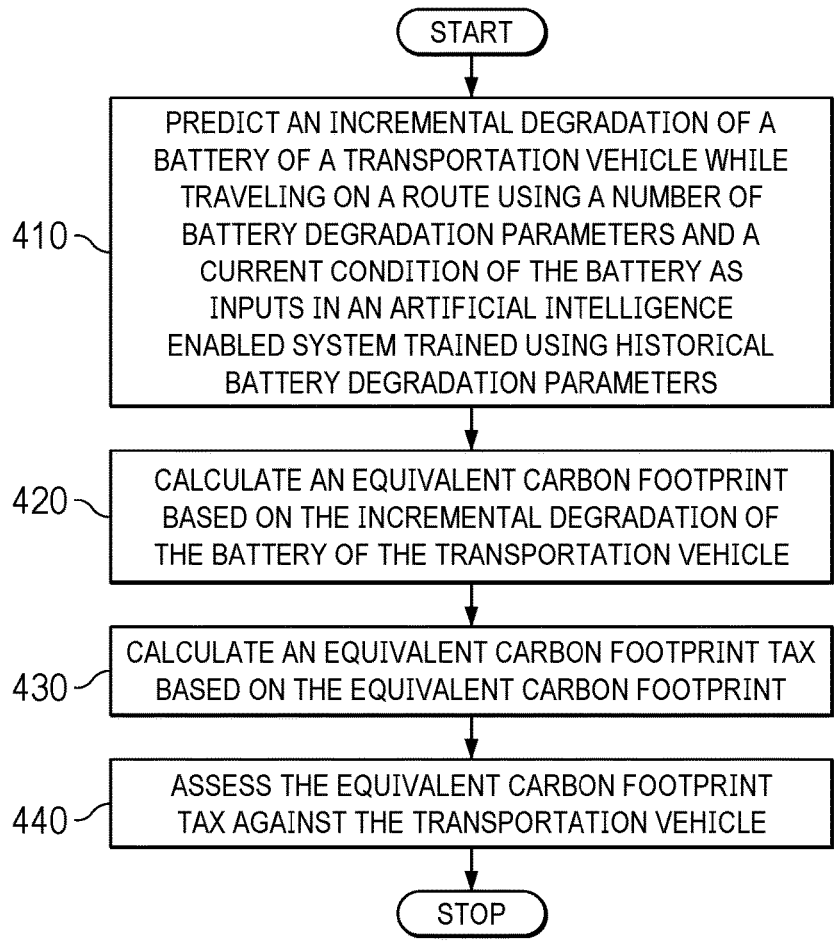
FIG. 4 is a flowchart of a process for predicting an incremental degradation of a battery of a transportation vehicle while traveling on a route, calculating an equivalent carbon footprint, calculating an equivalent tax, and assessing the tax against the vehicle in accordance with an illustrative embodiment.

Turning next to FIG. 4, a flowchart of a process to predict an incremental degradation of a battery of a transportation vehicle is depicted in accordance with an illustrative embodiment. The process in FIG. 4 can be implemented in hardware, software, or both. When implemented in software, the process can take the form of program instructions that are run by one of more processor units located in one or more hardware devices in one or more computer systems. For example, the process of FIG. 4 can be implemented in component 214 in computer system 212 in FIG. 2.

Block 410 predicts an incremental degradation of a battery of a transportation vehicle while traveling on a route using a number of battery degradation parameters and a current condition of the battery as inputs in an artificial intelligence enabled system trained using historical battery degradation parameters. Block 420 calculates an equivalent carbon footprint based on the incremental degradation of the battery of the transportation vehicle. Block 430 calculates an equivalent carbon footprint tax based on the equivalent carbon footprint. Block 440 assesses the equivalent carbon footprint tax against the transportation vehicle.

Figure 5:
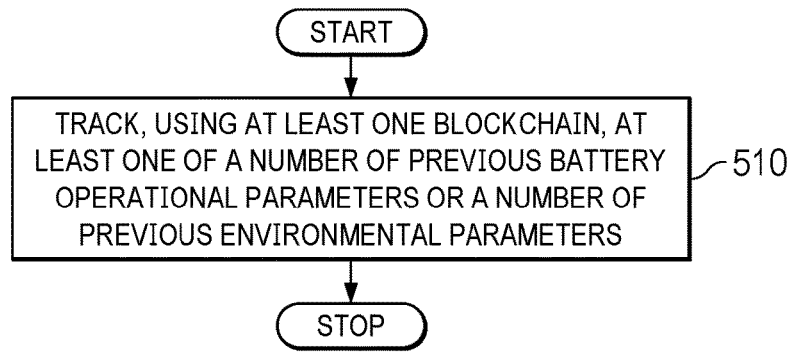
FIG. 5 is a flowchart of a process for tracking, using at least one blockchain, at least one of a number of previous battery operational parameters or a number of previous environmental parameters in accordance with an illustrative embodiment.

Turning now to FIG. 5, a flowchart of a process to track a number of previous battery operational parameters and a number of previous environmental parameters in accordance with an illustrative embodiment. The process in FIG. 5 can be implemented in hardware, software, or both.

Block 510 tracks, using at least one blockchain, at least one of a number of previous battery operational parameters or a number of previous environmental parameters.

Figure 6:
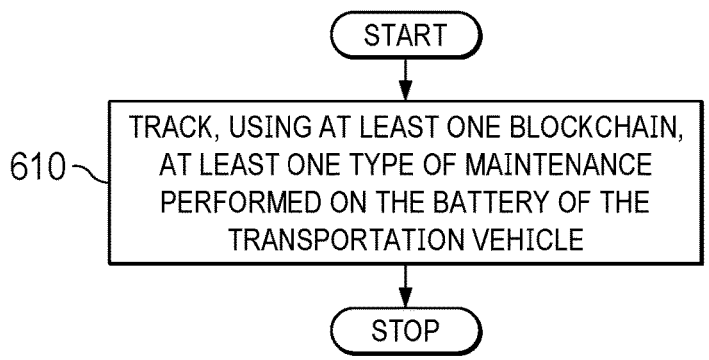
FIG. 6 is a flowchart of a process for tracking, using at least one blockchain, at least one type of maintenance performed on the battery of the transportation vehicle in accordance with an illustrative embodiment.

Turning now to FIG. 6, a flowchart of a process to track at least one type of maintenance performed on the battery of the transportation vehicle in accordance with an illustrative embodiment. The process in FIG. 6 can be implemented in hardware, software, or both.

Block 610 tracks, using at least one blockchain, at least one type of maintenance performed on the battery of the transportation vehicle.

Figure 7:
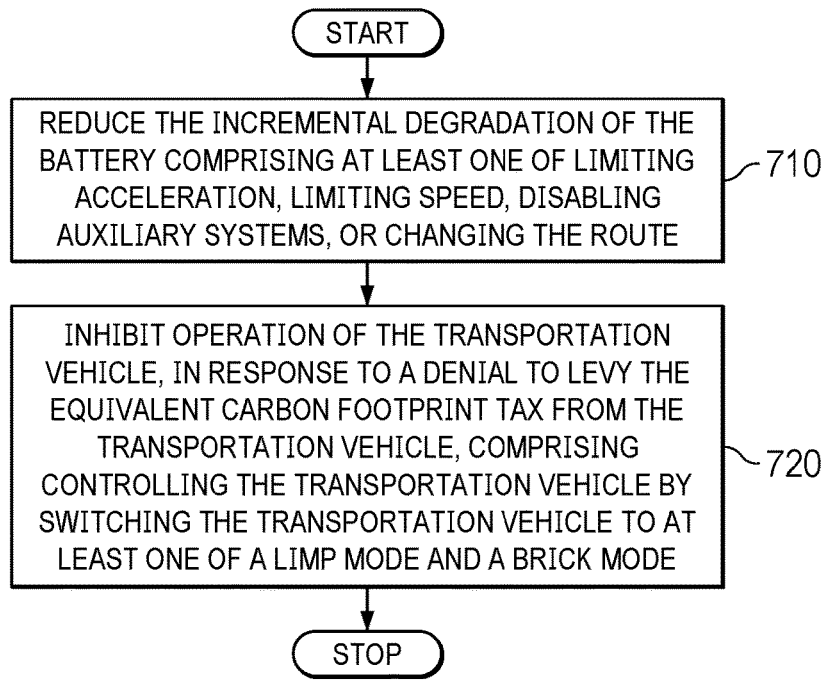
FIG. 7 is a flowchart of a process for reducing incremental degradation of the battery and inhibiting operation of the transportation vehicle in response to a denial to levy the equivalent carbon footprint tax from the transportation vehicle in accordance with an illustrative embodiment.

Turning now to FIG. 7, a flowchart of a process to inhibit operation of the transportation vehicle, in response to a denial to levy the equivalent carbon footprint tax from the transportation vehicle is depicted in accordance with an illustrative embodiment. The process in FIG. 7 can be implemented in hardware, software, or both.

Block 710 reduces the incremental degradation of the battery comprising at least one of limiting acceleration, limiting speed, disabling auxiliary systems, or changing the route. Block 720 inhibits operation of the transportation vehicle, in response to a denial to levy the equivalent carbon footprint tax from the transportation vehicle, comprising controlling the transportation vehicle by switching the transportation vehicle to at least one of a limp mode and a brick mode.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 8:
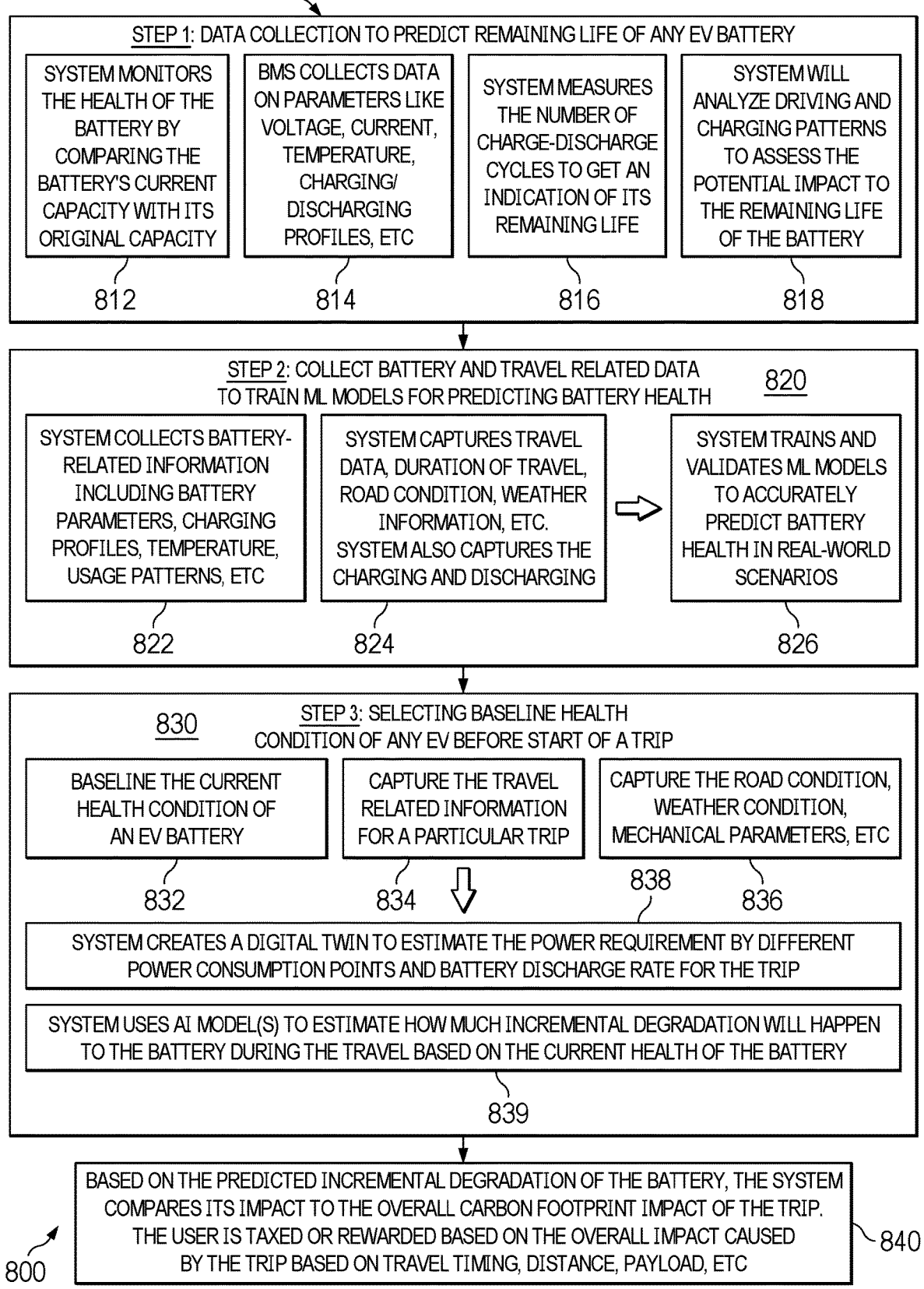
FIG. 8 is a block diagram of a process for predicting an incremental degradation of a battery of a transportation vehicle, calculating, assessing and levying an equivalent carbon footprint tax in accordance with an illustrative embodiment.

With reference next to FIG. 8, a flowchart of methodology 800 for predicting an incremental degradation of a battery of a transportation vehicle, calculating, assessing and levying an equivalent carbon footprint tax is depicted in accordance with an illustrative embodiment. The process in FIG. 8 can be implemented in hardware, software, or both. When implemented in software, the process can take the form of program instructions that are run by one or more processor units located in one or more hardware devices in one or more computer systems. For example, the process of FIG. 8 can be implemented in component 214 in computer system 212 in FIG. 2. Embodiments of this disclosure are not limited to methodology 800 and embodiments can include other methods and procedures.

In this example, block 810 is step 1 of the methodology 800. Block 810 includes data collection to predict the remaining life of a battery. The remaining life of a battery is dependent on chemistry, usage patterns, environmental conditions, and driving behavior of the transportation vehicle. Blocks 812-818 describe aspects of data collection to predict the remaining life of an EV battery.

Block 812 includes monitoring the state of health of the battery by comparing the battery's current capacity compared to its original capacity when it was new. This can be determined through periodic battery health checks or diagnostic tools provided by the vehicle manufacturer.

Electric Vehicles are typically factory equipped with a battery management system (BMS), that continuously monitors and manages the battery. In block 814 the BMS collects data on various battery parameters such as voltage, current, temperature, and charging/discharging profiles. Analyzing this data can provide insights into the battery's performance and degradation over time, allowing for predictions of remaining life.

Block 816 includes measuring the number of charge-discharge cycles the battery has undergone to obtain an indication of its remaining life. Battery manufacturers often specify the expected lifespan of their batteries in terms of the number of cycles they can endure. Monitoring and recording the cycle count can help estimate the remaining useful life of the battery based on the manufacturer's specifications.

Block 818 includes analyzing driving and charging patterns to provide valuable information about battery usage and potential impact on its remaining life. Factors such as frequent rapid charging, deep discharges, or consistently operating at high or low states of charge can influence battery degradation. By assessing these patterns, estimations on remaining battery life can be made.

Embodiments of this disclosure can include using machine learning and predictive models to analyze historical data from EV batteries and identify patterns and trends in battery degradation. These models can then provide predictions on the remaining life of the battery based on various input variables, including battery parameters, usage patterns, and environmental conditions.

Block 820 is step 2 of the methodology 800. Block 820 includes collecting battery and travel related data to train a machine learning models for predicting battery health. Blocks 822-826 describe aspects of collecting battery and travel related data to train a machine learning models for predicting battery health.

Embodiments of this disclosure can include using a number of machine learning models to predict vehicle battery health at any time. Embodiments can include a primary machine learning model, and optionally a secondary machine learning model.

Embodiments of this disclosure can include predicting the health condition of a vehicle battery using machine learning and predictive models including analyzing historical data and training models from vehicle telemetry, travel data and battery investigation reports.

Block 822 includes collecting a comprehensive dataset of battery-related information, including battery parameters, charging profiles, temperature, usage patterns, and other relevant variables. This data can cover a range of battery conditions and lifespans.

Block 824 includes capturing the travel data, duration of travel, road conditions, weather information and conditions, and other data for the entire data collection duration. Block 824 also includes capturing data during charging and discharging cycles of the battery. This can include capturing discharge rates after different recharging cycles.

Block 826 includes the system training a validating machine language models to accurately predict battery health in real-world scenarios.

Embodiments of this disclosure can include performing data cleansing and pre-processing the collected data to ensure its quality and remove any inconsistencies or outliers. This step may involve handling missing values, normalizing data, and encoding categorical variables.

Embodiments of this disclosure can include extracting meaningful features from the collected data that can serve as inputs to the predictive models. This can include derived variables, statistical summaries, or domain-specific knowledge-based features.

Embodiments of this disclosure can include selecting suitable machine learning algorithms for battery health prediction. Commonly used algorithms include regression models (such as linear regression, decision trees, or random forests), support vector machines, or neural networks. The choice of the model depends on the specific problem and data characteristics.

Embodiments of this disclosure can include splitting the pre-processed data into training and validation sets. Use the training set to train the chosen models by fitting them to the battery health-related features. This involves optimizing the model's parameters to minimize prediction errors or maximize accuracy.

Embodiments of this disclosure can include assessing the performance of the trained models using the validation set. Evaluate their predictive accuracy, precision, recall, or other relevant metrics. This step helps identify the most effective model(s) for battery health prediction.

Embodiments of this disclosure can include validating the selected model(s) using unseen test data to ensure its generalization capability. Evaluate the model's performance on this test set to ensure it can accurately predict battery health in real-world scenarios.

Block 830 is step 3 of the methodology 800. Block 830 includes selecting a baseline health condition of an EV before the start of a trip. Blocks 832-839 describe aspects of selecting a baseline health condition of an EV before the start of a trip.

Block 832 includes baselining the current health condition of an EV battery. This can include battery environmental parameters, battery specifications, previous battery environmental parameters, and previous vehicle operation parameters.

Embodiments of this disclosure can include an (AI) machine learning model identifying the current health condition of any transportation vehicle battery, from the vehicle telemetry, and the blockchain, invention will be identifying different operational and environmental parameters are used, and the battery count of recharging cycle, and will predict the current health of the battery.

Embodiments of this disclosure can include estimating how the transportation vehicle health will further be degraded incrementally when the transportation vehicle travels based on distance to be travelled, number of additional recharging cycles required, predicted road condition, and the vehicle power consumption points.

Block 834 includes capturing travel related information for a particular trip, such as distance to be travelled, number of recharging cycles required, and environmental parameters.

Block 836 includes capturing the road conditions, weather conditions, mechanical parameters, and other parameters.

Embodiments of this disclosure can include identifying the mechanical parameters, such as vibration, road conditions, and where the vehicle will be travelling.

Block 838 includes creating or receiving a digital twin simulation of the vehicle to estimate the power requirement by different power consumption points and battery discharge rates for a trip. Embodiments of this disclosure can include calculating how much power will be required by different power consumption points.

Embodiments of this disclosure can include receiving the self-weight and payload of the transportation vehicle and will be estimating the power required to travel and will be estimating the discharge rate.

Block 839 includes using a number of (AI) machine learning models to identify how much incremental degradation will happen in the battery during the travel, and it is depending on the current health condition of the battery.

Block 840 is step 4 of the methodology 800. Block 840 includes, based on predicted incremental degradation of the battery during the selected trip, the system comparing its impact to the overall carbon footprint impact of the trips. The user can be taxed or rewarded based on the overall impact caused by the trip based on travel timing, distance, payload and/or other factors.

Embodiments of this disclosure can include a predetermined or predefined equivalent carbon footprint based on battery degradation rate. This can be termed an equivalent carbon footprint rule. Embodiments can include using the predefined equivalent carbon footprint rule to impose equivalent carbon footprint tax. The equivalent carbon footprint tax can be calculated dynamically based on the travel timing, distance, payload, and other factors. The equivalent carbon footprint tax can be positive or negative depending on these factors.

Figure 9:
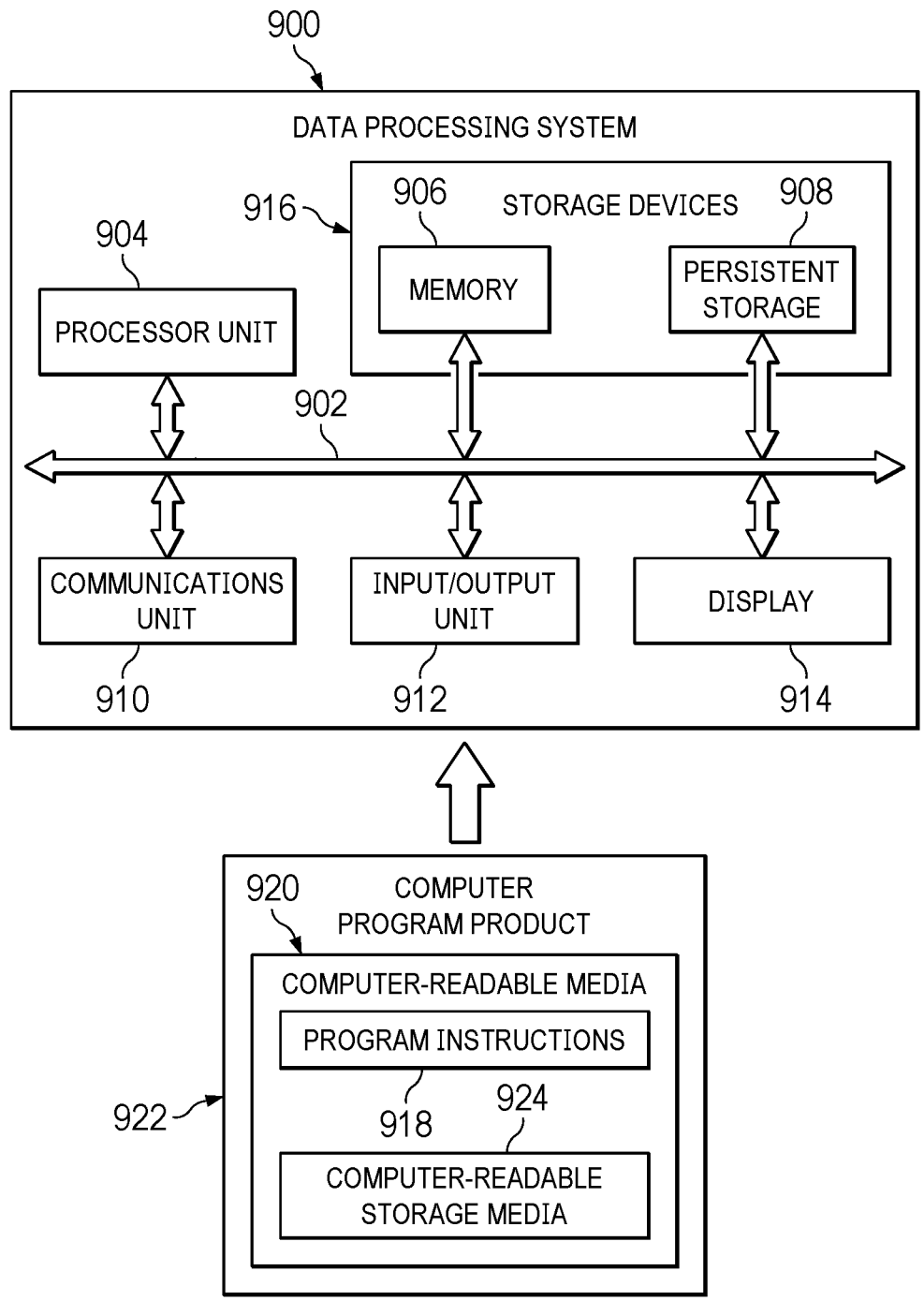
FIG. 9 is a block diagram of a data processing system in accordance with an illustrative embodiment.

Turning now to FIG. 9, a block diagram of a data processing system is depicted in accordance with an illustrative embodiment. Data processing system 900 can be used to implement computers and computing devices in computing environment 100 in FIG. 1. Data processing system 900 can also be used to implement computer system 212 in FIG. 2. In this illustrative example, data processing system 900 includes communications framework 902, which provides communications between processor unit 904, memory 906, persistent storage 908, communications unit 910, input/output (I/O) unit 912, and display 914. In this example, communications framework 902 takes the form of a bus system.

Processor unit 904 serves to execute instructions for software that can be loaded into memory 906. Processor unit 904 includes one or more processors. For example, processor unit 904 can be selected from at least one of a multicore processor, a central processing unit (CPU), a graphics processing unit (GPU), a physics processing unit (PPU), a digital signal processor (DSP), a network processor, or some other suitable type of processor. Further, processor unit 904 can be implemented using one or more heterogeneous processor systems in which a main processor is present with secondary processors on a single chip. As another illustrative example, processor unit 904 can be a symmetric multi-processor system containing multiple processors of the same type on a single chip.

Memory 906 and persistent storage 908 are examples of storage devices 916. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 916 may also be referred to as computer readable storage devices in these illustrative examples. Memory 906, in these examples, can be, for example, a random-access memory or any other suitable volatile or non-volatile storage device. Persistent storage 908 may take various forms, depending on the particular implementation.

For example, persistent storage 908 may contain one or more components or devices. For example, persistent storage 908 can be a hard drive, a solid-state drive (SSD), a flash memory, a rewritable optical disk, a rewritable magnetic tape, or some combination of the above. The media used by persistent storage 908 also can be removable. For example, a removable hard drive can be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that can be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs can be located in storage devices 916, which are in communication with processor unit 904 through communications framework 902. The processes of the different embodiments can be performed by processor unit 904 using computer-implemented instructions, which may be located in a memory, such as memory 906.

These instructions are referred to as program instructions, computer usable program instructions, or computer readable program instructions that can be read and executed by a processor in processor unit 904. The program instructions in the different embodiments can be embodied on different physical or computer readable storage media, such as memory 906 or persistent storage 908.

Program instructions 918 are located in a functional form on computer readable media 920 that is selectively removable and can be loaded onto or transferred to data processing system 900 for execution by processor unit 904. Program instructions 918 and computer readable media 920 form computer program product 922 in these illustrative examples. In the illustrative example, computer readable media 920 is computer readable storage media 924.

Computer readable storage media 924 is a physical or tangible storage device used to store program instructions 918 rather than a medium that propagates or transmits program instructions 918. Computer readable storage media 924, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 918 can be transferred to data processing system 900 using a computer readable signal media. The computer readable signal media are signals and can be, for example, a propagated data signal containing program instructions 918. For example, the computer readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer readable media 920 can be singular or plural. For example, program instructions 918 can be located in computer readable media 920 in the form of a single storage device or system. In another example, program instructions 918 can be located in computer readable media 920 that is distributed in multiple data processing systems. In other words, some instructions in program instructions 918 can be located in one data processing system while other instructions in program instructions 918 can be located in one data processing system. For example, a portion of program instructions 918 can be located in computer readable media 920 in a server computer while another portion of program instructions 918 can be located in computer readable media 920 located in a set of client computers.

The different components illustrated for data processing system 900 are not meant to provide architectural limitations to the manner in which different embodiments can be implemented. In some illustrative examples, one or more of the components may be incorporated in or otherwise form a portion of, another component. For example, memory 906, or portions thereof, may be incorporated in processor unit 904 in some illustrative examples. The different illustrative embodiments can be implemented in a data processing system including components in addition to or in place of those illustrated for data processing system 900. Other components shown in FIG. 9 can be varied from the illustrative examples shown. The different embodiments can be implemented using any hardware device or system capable of running program instructions 918.

Thus, illustrative embodiments of the present invention provide a computer implemented method, computer system, and computer program product for predicting, using an artificial intelligence enabled system, an incremental degradation of a battery of a transportation vehicle based on a selected route, historical learning about battery degradation parameters, and a current condition of the battery of the transportation vehicle; calculating an equivalent carbon footprint tax based on the incremental degradation of the battery of the transportation vehicle; and assessing the equivalent carbon footprint tax against the transportation vehicle.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method comprising:
predicting, by a number of processor units, an incremental degradation of a battery of a transportation vehicle while traveling on a route using a number of battery degradation parameters and a current condition of the battery as inputs in an artificial intelligence enabled system trained using historical battery degradation parameters;
calculating, by the number of processor units, an equivalent carbon footprint based on the incremental degradation of the battery of the transportation vehicle;
calculating, by the number of processor units, an equivalent carbon footprint tax based on the equivalent carbon footprint;
assessing, by the number of processor units, the equivalent carbon footprint tax against the transportation vehicle; and
inhibiting, by the number of processor units, operation of the transportation vehicle, in response to a denial to levy the equivalent carbon footprint tax from the transportation vehicle, comprising controlling the transportation vehicle by switching the transportation vehicle to a limp mode.

2. The computer implemented method of claim 1,
wherein predicting the incremental degradation of the battery of the transportation vehicle comprises estimating the current condition of the battery of the transportation vehicle based on at least one of a number of previous recharging cycles, a number of previous vehicle operation parameters, a number of previous battery environmental parameters, or a number of battery specifications.

3. The computer implemented method of claim 2,
wherein calculating an equivalent carbon footprint tax comprises calculating the equivalent carbon footprint tax while the transportation vehicle is travelling the route based on the current condition of the battery as a baseline, a number of vehicle operation parameters while the transportation vehicle is travelling the route, a number of battery environmental parameters while the transportation vehicle is travelling the route, and the number of battery specifications.

4. The computer implemented method of claim 1,
wherein predicting the incremental degradation of a battery of a transportation vehicle comprises tracking, using at least one blockchain, at least one of a number of previous battery operational parameters or a number of previous environmental parameters and
wherein predicting the incremental degradation of a battery of a transportation vehicle is based on at least one of the number of previous battery operational parameters or the number of previous environmental parameters.

5. The computer implemented method of claim 1,
wherein predicting the incremental degradation of the battery of the transportation vehicle is further based on a source of power and a dynamic usage pattern of the battery of the transportation vehicle.

6. The computer implemented method of claim 1,
wherein predicting the incremental degradation of the battery of the transportation vehicle comprises tracking, using at least one blockchain, at least one type of maintenance performed on the battery of the transportation vehicle and
wherein predicting the incremental degradation of the battery of a transportation vehicle is further based on historical learning about how the at least one type of maintenance performed on the battery of the transportation vehicle changes the current condition of the battery of the transportation vehicle.

7. The computer implemented method of claim 1, further comprising
reducing, by the number of processor units, the incremental degradation of the battery comprising at least one of limiting acceleration, limiting speed, disabling auxiliary systems, or changing the route.

8. A computer system comprising:
a number of processor units, wherein the number of processor units executes program instructions to:
predict, by the number of processor units, an incremental degradation of a battery of a transportation vehicle while traveling on a route using a number of battery degradation parameters and a current condition of the battery as inputs in an artificial intelligence enabled system trained using historical battery degradation parameters;
calculate, by the number of processor units, an equivalent carbon footprint based on the incremental degradation of the battery of the transportation vehicle;
calculate, by the number of processor units, an equivalent carbon footprint tax based on the equivalent carbon footprint;
assess, by the number of processor units, the equivalent carbon footprint tax against the transportation vehicle; and
inhibit operation of the transportation vehicle, in response to a denial to levy the equivalent carbon footprint tax from the transportation vehicle, comprising controlling the transportation vehicle by switching the transportation vehicle to a limp mode.

9. The computer system of claim 8, wherein the number of processor units further executes program instructions to:
estimate a current condition of the battery of the transportation vehicle based on at least one of a number of previous recharging cycles, a number of previous vehicle operation parameters, a number of previous battery environmental parameters, or a number of battery specifications.

10. The computer system of claim 9, wherein the number of processor units further executes program instructions to:
calculate the equivalent carbon footprint tax while the transportation vehicle is travelling the route based on the current condition of the battery as a baseline, a number of vehicle operation parameters while the transportation vehicle is travelling the route, a number of battery environmental parameters while the transportation vehicle is travelling the route, and the number of battery specifications.

11. The computer system of claim 8, wherein the number of processor units further executes program instructions to:
track, using at least one blockchain, at least one of a number of previous battery operational parameters or a number of previous environmental parameters and
wherein predict the incremental degradation of a battery of a transportation vehicle is further based on at least one of the number of previous battery operational parameters or the number of previous environmental parameters.

12. The computer system of claim 8, wherein the number of processor units further executes program instructions to: predict the incremental degradation of the battery of the transportation vehicle further based on a source of power and a dynamic usage pattern of the battery of the transportation vehicle.

13. The computer system of claim 8, wherein the number of processor units further executes program instructions to:
   track, using at least one blockchain, at least one type of maintenance performed on the battery of the transportation vehicle and
   wherein predict the incremental degradation of a battery of a transportation vehicle is further based on historical learning about how the at least one type of maintenance performed on the battery of the transportation vehicle changes the current condition of the battery of the transportation vehicle.

14. The computer system of claim 8, wherein the number of processor units further executes program instructions to:
   reduce incremental degradation of the battery comprising at least one of limiting acceleration, limiting speed, disabling auxiliary systems, or changing the route.

15. A computer program product comprising
   a computer readable storage medium having program instructions embodied therewith, the program instructions executable by a computer system to cause the computer system to:
   predict, by a number of processor units, an incremental degradation of a battery of a transportation vehicle while traveling on a route using a number of battery degradation parameters and a current condition of the battery as inputs in an artificial intelligence enabled system trained using historical battery degradation parameters;
   calculate, by the number of processor units, an equivalent carbon footprint based on the incremental degradation of the battery of the transportation vehicle;
   calculate, by the number of processor units, an equivalent carbon footprint tax based on the equivalent carbon footprint;
assess, by the number of processor units, the equivalent carbon footprint tax against the transportation vehicle; and
   inhibit operation of the transportation vehicle, in response to a denial to levy the equivalent carbon footprint tax from the transportation vehicle, comprising controlling the transportation vehicle by switching the transportation vehicle to a limp mode.

16. The computer program product of claim 15, wherein the program instructions are further executable by the computer system to cause the computer system to: estimate a current condition of the battery of the transportation vehicle based on at least one of a number of previous recharging cycles, a number of previous vehicle operation parameters, a number of previous battery environmental parameters, or a number of battery specifications.

17. The computer program product of claim 16, wherein the program instructions are further executable by the computer system to cause the computer system to: calculate the equivalent carbon footprint tax while the transportation vehicle is travelling the route based on the current condition of the battery as a baseline, a number of vehicle operation parameters while the transportation vehicle is travelling the route, a number of battery environmental parameters while the transportation vehicle is travelling the route, and the number of battery specifications.

18. The computer program product of claim 15, wherein the program instructions are further executable by the computer system to cause the computer system to: track, using at least one blockchain, at least one of a number of previous battery operational parameters or a number of previous environmental parameters and
   wherein predict the incremental degradation of a battery of a transportation vehicle is further based on at least one of the number of previous battery operational parameters or the number of previous environmental parameters.

19. Computer program product of claim 15, wherein the program instructions are further executable by the computer system to cause the computer system to:
   track, using at least one blockchain, at least one type of maintenance performed on the battery of the transportation vehicle and
   wherein predict incremental degradation of a battery of a transportation vehicle is further based on historical learning about how the at least one type of maintenance performed on the battery of the transportation vehicle changes the current condition of the battery of the transportation vehicle.

20. The computer program product of claim 15, wherein the program instructions are further executable by the computer system to cause the computer system to: reduce incremental degradation of the battery comprising at least one of limiting acceleration, limiting speed, disabling auxiliary systems, or changing the route.

\* \* \* \* \*